(12) United States Patent
Baldwin et al.

(10) Patent No.: US 10,353,760 B2
(45) Date of Patent: *Jul. 16, 2019

(54) SYSTEM VERIFICATION OF INTERACTIVE SCREENSHOTS AND LOG FILES BETWEEN CLIENT SYSTEMS AND SERVER SYSTEMS WITHIN A NETWORK COMPUTING ENVIRONMENT

(71) Applicant: International Business Machines Corporation, Armonk, NY (US)

(72) Inventors: Nicholas A. Baldwin, Gladesville (AU); Philip S. Chan, Marrickville (AU); Eric Martinez de Morentin, Manly (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/631,884

(22) Filed: Feb. 26, 2015

(65) Prior Publication Data
US 2015/0370622 A1 Dec. 24, 2015

Related U.S. Application Data

(63) Continuation of application No. 14/312,771, filed on Jun. 24, 2014.

(51) Int. Cl.
G06F 9/44 (2018.01)
G06F 21/51 (2013.01)
(Continued)

(52) U.S. Cl.
CPC ........ *G06F 11/079* (2013.01); *G06F 11/0748* (2013.01); *G06F 11/3006* (2013.01);
(Continued)

(58) Field of Classification Search
CPC .............................. G06F 11/079; H04L 43/04
(Continued)

(56) References Cited

U.S. PATENT DOCUMENTS 8,032,489 B2 10/2011 Villella et al.
8,112,398 B1 2/2012 Hernandez
(Continued)

FOREIGN PATENT DOCUMENTS

WO 0047003 A1 8/2000
WO 2013162503 A1 10/2013

OTHER PUBLICATIONS

IBM: List of IBM Patents or Patent Applications Treated as Related (Appendix P).
(Continued)

*Primary Examiner* — Kevin T Bates
*Assistant Examiner* — Mark A Scott
(74) *Attorney, Agent, or Firm* — Arnold B. Bangali

(57) ABSTRACT

A computer-implemented method for system performance verification is provided. The computer-implemented method includes invoking an integrated system tool to perform system performance verification of a client system. The computer-implemented method further includes monitoring administrative actions within an interface of the client system of an administrative device during the system performance verification. The computer-implemented method further includes recording screenshots of the monitored administrative actions, wherein the recorded screenshots are recorded to administrative log files of the administrative device. The computer-implemented method further includes transmitting the recorded screenshots to a storage location of system log files, wherein the recorded screenshots are asso-
(Continued)

ciated with appropriate system log files for performing diagnosis of system performance verification of the client system.

3 Claims, 9 Drawing Sheets

(51) Int. Cl.
  *G06F 11/07* (2006.01)
  *H04L 12/26* (2006.01)
  *G06F 11/34* (2006.01)
  *G06F 11/30* (2006.01)

(52) U.S. Cl.
  CPC ...... *G06F 11/3414* (2013.01); *G06F 11/3476* (2013.01); *H04L 43/04* (2013.01); *H04L 43/50* (2013.01); *G06F 11/0778* (2013.01)

(58) Field of Classification Search
  USPC .......................................... 714/37; 709/224
  See application file for complete search history.

(56) References Cited

U.S. PATENT DOCUMENTS

| | | | |
|---|---|---|---|
| 8,171,351 B1 | 5/2012 | Tomay et al. | |
| 8,271,618 B1 | 9/2012 | Kridlo | |
| 8,332,765 B2 | 12/2012 | Ergan et al. | |
| 8,504,994 B2 | 8/2013 | Golender et al. | |
| 8,655,336 B1* | 2/2014 | Dempski | H04L 41/5074 370/310.2 |
| 8,863,085 B1* | 10/2014 | Stahlberg | G06F 11/3668 717/124 |
| 9,021,443 B1* | 4/2015 | Lachwani | G06F 11/3664 717/124 |
| 2007/0174816 A1 | 7/2007 | Cavanaugh et al. | |
| 2008/0141221 A1* | 6/2008 | Benesovska | G06F 9/45512 717/124 |
| 2008/0244523 A1* | 10/2008 | Kelso | G06F 11/3664 717/124 |
| 2008/0256399 A1* | 10/2008 | Erdosi | G06F 11/366 714/47.1 |
| 2008/0282160 A1* | 11/2008 | Tonnison | G06F 9/4443 715/704 |
| 2008/0310736 A1* | 12/2008 | Chattopadhyay | G06F 11/3692 382/218 |
| 2009/0077539 A1* | 3/2009 | Booth | G06F 11/3688 717/124 |
| 2009/0106596 A1* | 4/2009 | Fallen | G06F 11/0748 714/37 |
| 2009/0144699 A1* | 6/2009 | Fendt | G06F 11/004 717/120 |
| 2009/0150868 A1* | 6/2009 | Chakra | G06F 11/3692 717/125 |
| 2009/0193298 A1* | 7/2009 | Mukherjee | G06F 11/0718 714/38.1 |
| 2010/0058366 A1* | 3/2010 | Swildens | G06F 11/3414 719/329 |
| 2011/0016205 A1* | 1/2011 | DeBettencourt | H04L 67/22 709/224 |
| 2011/0060948 A1* | 3/2011 | Beebe | H04L 43/0817 714/37 |
| 2011/0093773 A1* | 4/2011 | Yee | G06F 17/30896 715/235 |
| 2011/0314148 A1* | 12/2011 | Petersen | G06F 11/3476 709/224 |
| 2011/0314343 A1* | 12/2011 | Hoke | G06F 11/3696 714/45 |
| 2012/0017170 A1* | 1/2012 | Lawrance | G06F 11/3688 715/788 |
| 2012/0042281 A1* | 2/2012 | Green | G06F 9/4448 715/810 |
| 2012/0174069 A1* | 7/2012 | Zavatone | G06F 11/3692 717/124 |
| 2012/0221949 A1 | 8/2012 | Olsa | |
| 2012/0253745 A1* | 10/2012 | Dhanapal | G06F 11/3688 702/186 |
| 2012/0317549 A1* | 12/2012 | Cunningham | G06F 11/3612 717/128 |
| 2013/0004087 A1 | 1/2013 | Kumar | |
| 2013/0014084 A1* | 1/2013 | Sahibzada | G06F 11/368 717/124 |
| 2013/0152047 A1* | 6/2013 | Moorthi | G06F 11/368 717/124 |
| 2013/0227352 A1* | 8/2013 | Kumarasamy | G06F 11/3072 714/47.1 |
| 2013/0249917 A1* | 9/2013 | Fanning | G06T 11/206 345/440 |
| 2013/0305222 A1* | 11/2013 | Cinar | G06F 8/30 717/124 |
| 2014/0074452 A1* | 3/2014 | Carmi | G06F 8/10 703/22 |
| 2014/0075344 A1* | 3/2014 | Bentrup | G06F 11/3664 715/760 |
| 2014/0075371 A1* | 3/2014 | Carmi | G06F 11/3438 715/781 |
| 2014/0109061 A1* | 4/2014 | Gibbens | G06F 11/3688 717/126 |
| 2014/0109063 A1* | 4/2014 | Schissel | G06F 11/368 717/127 |
| 2014/0157242 A1* | 6/2014 | Campbell | G06F 11/3692 717/131 |
| 2014/0189576 A1* | 7/2014 | Carmi | G06F 3/0481 715/781 |
| 2014/0218385 A1* | 8/2014 | Carmi | G09G 5/377 345/590 |
| 2014/0257828 A1* | 9/2014 | Thornley | G06F 11/00 705/2 |
| 2014/0325484 A1* | 10/2014 | Gillaspie | G06F 11/3684 717/124 |
| 2015/0081875 A1 | 3/2015 | Ambe | |
| 2015/0082280 A1* | 3/2015 | Betak | G06F 11/3692 717/124 |
| 2015/0086115 A1* | 3/2015 | Danko | G06F 16/5838 382/190 |
| 2015/0161031 A1 | 6/2015 | Chea | |
| 2015/0317147 A1* | 11/2015 | Nachimuthu | G06F 8/65 717/173 |
| 2015/0331779 A1* | 11/2015 | Subramaniam | G06F 11/368 717/124 |
| 2015/0347270 A1* | 12/2015 | Cheng | G06F 11/3664 714/38.1 |
| 2015/0370691 A1 | 12/2015 | Pandey | |
| 2016/0335174 A1 | 11/2016 | Amichai et al. | |
| 2017/0006188 A1 | 1/2017 | Amichai et al. | |
| 2017/0147480 A1* | 5/2017 | Lachwani | G06F 11/3684 |
| 2017/0220452 A1* | 8/2017 | Ren | G06F 11/3624 |

OTHER PUBLICATIONS

Pending U.S. Appl. No. 14/312,771, entitled:"System Verification of Interactive Screenshots and Log Files Between Client Systems and Server Systems Within a Network Computing Environment", filed Jun. 24, 2014.

Yuan, "Improving Failure Diagnosis via Better Design and Analysis of Log Messages", 2012 by Ding Yuan, Dissertation Submitted in partial fulfillment of the requirements for the degree of Doctor of Philosophy in Computer Science in the Graduate College of the University of Illinois at Urbana-Champaign, 2012 Urbana, Illinois, pp. 1-150.

Yuan et al., "Improving Software Diagnosability via Log Enhancement", ACM Transactions on Computer Systems, vol. 30, No. 1, Article 4 (Feb. 2012), DOI = 10.1145/2110356.2110360 http://doi.acm.org/10.1145/2110356.2110360, pp. 4:1-4:28.

"A System and Method to do Log Analysis and User Behavior tracking at runtime", IP.com No. IPCOM000208649D, Jul. 14, 2011, pp. 1-7.

(56) References Cited

OTHER PUBLICATIONS

"Screenshot", http://robotframework.googlecode.com/hg/doc/libraries/Screenshot.html . . . , Accessed on Jan. 29, 2014, pp. 1-2.
Pending U.S. Appl. No. 13/595,420 entitled: "System and Method for Capturing Logging Information", filed Aug. 27, 2012, Chan et al.

* cited by examiner

SYSTEM VERIFICATION OF INTERACTIVE SCREENSHOTS AND LOG FILES BETWEEN CLIENT SYSTEMS AND SERVER SYSTEMS WITHIN A NETWORK COMPUTING ENVIRONMENT

BACKGROUND

The present invention relates to system performance verification of a computing device and, more particularly to, client system performance verification of screenshots of administrative interactions, and system diagnosis log files of a computing device.

A client system includes hardware devices, and software programs, or a collection of software programs that operate on the client system, to provide a platform, on which the hardware devices and the software programs can operate. Further, client applications of the client system typically perform essential functions that are required to maintain proper operation of the hardware devices and software applications, operating on the client system. However, some hardware devices, or software applications of the client system may experience error conditions during system operations of the client system. For instance, an error, or crash, can cause other devices, programs, or software applications of the client system, to cease operation, or execution of the client system.

SUMMARY

A computer-implemented method for system performance verification is provided. The computer-implemented method includes invoking, by the one or more processors, an integrated system tool to perform system performance verification of a client system, wherein the integrated system tool is invoked to perform the system performance verification based on an indication to initiate a diagnosis test of system operations of the client system. The computer-implemented method further includes monitoring, by the one or more processors, administrative actions within an interface of the client system of an administrative device during the initiated diagnosis test of the system operations. The computer-implemented method further includes recording, by the one or more processors, screenshots of the monitored administrative actions, wherein the recorded screenshots are recorded to administrative log files of the administrative device. The computer-implemented method further includes transmitting, by the one or more processors, the recorded screenshots to a storage location of system log files of the integrated system tool, wherein the recorded screenshots are associated with appropriate system log files for performing diagnosis of system performance verification of the client system.

A computer system for system performance verification is provided. The computer system includes one or more processors, one or more computer-readable memories, one or more computer-readable tangible storage devices and program instructions which are stored on at least one of the one or more storage devices for execution by at least one of the one or more processors via at least one of the one or more memories. The computer system includes program instructions to an integrated system tool to perform system performance verification of a client system, wherein the integrated system tool is invoked to perform the system performance verification based on an indication to initiate a diagnosis test of system operations of the client system. The computer system further includes program instructions to monitor administrative actions within an interface of the client system of an administrative device during the initiated diagnosis test of the system operations. The computer system further includes program instructions to record screenshots of the monitored administrative actions, wherein the recorded screenshots are recorded to administrative log files of the administrative device. The computer system further includes program instructions to transmit the recorded screenshots to a storage location of system log files of the integrated system tool, wherein the recorded screenshots are associated with appropriate system log files for performing diagnosis of system performance verification of the client system.

A computer program product for system performance verification is provided. The computer program product includes one or more processors, one or more computer-readable memories, one or more computer-readable tangible storage devices and program instructions which are stored on at least one of the one or more storage devices for execution by at least one of the one or more processors via at least one of the one or more memories. The computer program product includes program instructions to an integrated system tool to perform system performance verification of a client system, wherein the integrated system tool is invoked to perform the system performance verification based on an indication to initiate a diagnosis test of system operations of the client system. The computer program product includes program instructions to monitor administrative actions within an interface of the client system of an administrative device during the initiated diagnosis test of the system operations. The computer program product includes program instructions to record screenshots of the monitored administrative actions, wherein the recorded screenshots are recorded to administrative log files of the administrative device. The computer program product includes program instructions to transmit the recorded screenshots to a storage location of system log files of the integrated system tool, wherein the recorded screenshots are associated with appropriate system log files for performing diagnosis of system performance verification of the client system.

BRIEF DESCRIPTION OF THE SEVERAL VIEWS OF THE DRAWINGS

Novel characteristics of the invention are set forth in the appended claims. The invention will best be understood by reference to the following detailed description of the invention when read in conjunction with the accompanying figures, wherein like reference numerals indicate like components, and:

DETAILED DESCRIPTION

Figure 1:
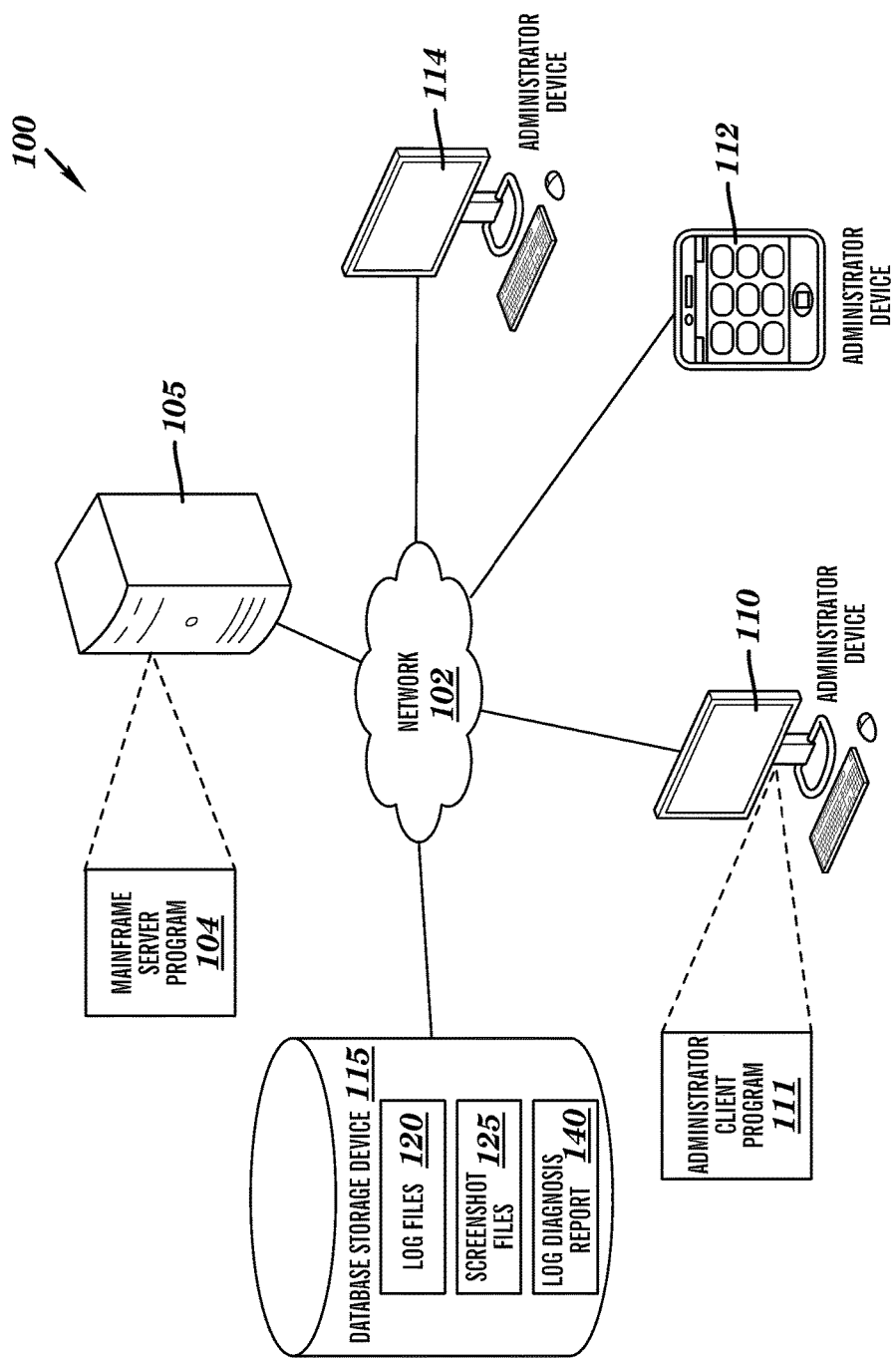
FIG. 1 is a functional block diagram that depicts a system performance verification environment, for recording client administrative actions of a system application of a client computing device, to identify a cause of a crash, or defect of the system application in accordance with embodiments of the present invention.

When diagnosing a crash or defect of software products, it is often difficult to know, or detect actions that caused a particular crash or defect of the software product. Log files are typically used by software applications to record messages during operation of software applications to detect a cause of the crash or defect, during system operations of the software applications. However, the nature of the log files, which can be, for example, an unformatted text file containing a long stream of messages, makes it difficult to identify relevant sections of the log files, or the messages that relates to a cause, or issue of the crash or defect of the software applications.

Also, once crash or defect is found or detected in the log files, the crash or defect is manually reproduced, by an engineer, or systems administrator of the software application, in order to diagnose the crash or defect, which can be time consuming. Embodiments of the present invention includes one or more circuits, or subassemblies of circuits, as well as, a system, or computer-implemented methods of operations, for recording client administrative actions of a system application of a client computing device, to identify a cause of a crash, or defect of the system application, during software performance verification, or system diagnosis of the client computing device.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof.

A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA, Smalltalk, C++ or the like, conventional procedural programming languages such as the "C" programming language, a hardware description language such as VERILOG, or similar programming languages. The program code may execute entirely on the user's computer, partly on the user's computer, as a stand-alone software package, partly on the user's computer and partly on a remote computer or entirely on the remote computer or server.

In the latter scenario, the remote computer may be connected to the user's computer through any type of network, including a local area network (LAN) or a wide area network (WAN), or the connection may be made to an external computer (for example, through the Internet using an Internet Service Provider). Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The present invention will now be described in details with reference to the accompanying. Referring to FIG. 1, system performance verification environment 100, for recording client administrative actions of a system application of a client computing device, to identify a cause of a crash, or defect of the system application, during software performance verification, or system diagnosis of the client computing device, is illustrated, in accordance with embodiments of the present invention.

The administrative actions can include, for example, client, user, or administrator utilization, or interaction, with a system, and/or a client application program of the client computing device. The administrator actions can also be based on administrator, or client management of hardware of the client computing device, such as, administrative control of monitor, keyboard, or mouse, and/or administrator control of program applications of the client application programs, which are recorded to diagnose a system crash, or problem of the client computing device.

According to at least one aspects, the recorded system administrator actions are recorded as screenshot log files, wherein the screenshot log files are associated, and identified with system log files of a server system application, for performing diagnosis of the software performance verification of the client system application. For instance, the screenshots log files are injected as client screenshots, either directly, or as a reference, with the system log files of the server system, thus, allowing the recorded administrative actions to be directly referenced, or identified, with appropriate server system test diagnosis log reports of the system log files.

The screenshot can also include a diagnosis program list of the recorded administrative actions application of the client system application, including, for example, linklist, aplist, lpalst list, version information list, page data sets list, and system memory list of the examined system application. Further, the screenshots can also be a captured state of operations of the client system application at a particular point in time, based on a configured timestamp.

System performance verification environment 100 includes administrator devices 110, 112, 114, mainframe server system 105, and database storage device 115, all interconnected over network 102. Administrator devices 110, 112, 114, mainframe server system 105, and database storage device 115, operate over network 102 to facilitate recording of administrator, user, or client interactions, during software performance verification, of a system under diagnosis test, or performance analysis, within system performance verification system environment 100, in accordance with embodiments of the present invention.

Administrator devices 110, 112, 114 can be, for example, a laptop, tablet, or notebook personal computer (PC), a desktop computer, a mainframe or mini computer, or a personal digital assistant (PDA). Administrator devices 110, 112, 114 can also be any portable device that provides computing, information storage and, computing retrieval capabilities, including, for example, a handheld device, or handheld computer, pocket PC, connected organizer, electronic book (eBook) reader, a personal digital assistant (PDA), a smart phone, or other portable devices.

Each one of administrator devices 110, 112, 114 includes administrator client program 111. Administrator client program 111 can be any type of software system application, which executes program instructions in administrator devices 110, 112, 114. Administrative client program 111 can also be a client enterprise system application that operates program instructions of the Internet, and other software program applications of administrator devices 110, 112, 114, thus providing a comprehensive, and diverse software program execution platform for executing the program instruction in administrator devices 110, 112, 114.

According to at least one embodiment, the software program execution platform can be utilized by administrator client program 111, or by a server program application of mainframe server system 105, to monitor administrative actions of a client, user, or administrator of administrator client program 111, wherein the monitored administrative actions are recorded as screenshot log files, during software performance verification, or diagnosis of administrative client program 112. The monitored performance verification of administrator client program 111, can also be governed, or managed, manually, by either the client, or systems administrator of administrator client program 111, or dynamically, by the server program application, all within system performance verification system environment 100.

Administrative client program 111 can also be any type of client, or system software application in which the systems administrator can optionally invoke a software performance verification tool kit, for conducting performance verification of screenshot log files of administrative client program 111, by recording interactions of the systems administrator, during software performance verification, or software analysis, of administrator client program 111, before and after mainframe server system 105, or administrator devices 110, 112, 114, is rebooted, wherein, the screenshot log files are associated, and compared with appropriate system test diagnosis log reports of the system log files, and wherein the diagnose log report is adaptive to identify a cause of system crash, or defect of administrative client program 111.

Mainframe server system 105 can be, for example, a mainframe server computer system such as a management server, a web server, or any other electronic device or computing system capable of receiving, and sending data performance verification of recorded administrative actions of administrative client program 111, as screenshots log files, wherein the screenshot log files injected, as screenshots, either directly, or as a reference, to system log files of mainframe server system 105, for performance verification of administrative client program 111.

Mainframe server system 105 can also represent a "cloud" of computers interconnected by one or more networks, wherein mainframe server system 105 is a primary server for a computing system utilizing clustered computers when accessed through network 102. A cloud computing system can be an implementation for performance verification administrative client program 111. Mainframe server system 105 includes mainframe server program 104.

Mainframe server program 104 includes a system performance verification tool, which is invoked, either manually, or dynamically to perform system performance verification of administrative client program 111, during the system performance verification of administrative client program 111. For example, mainframe server program 104 receives, from administrative client program 111, screenshots of recorded actions of a client, or a systems administrator of administrative client program 111, wherein, the screenshots are associated with system log files of mainframe server program 104 to diagnose, for example, cause of a problem, crash, or defect of system performance of administrative client program 111, in accordance with embodiments of the present invention.

Database storage device 115 is any type of storage device, storage server, storage area network, redundant array of independent discs (RAID), cloud storage service, or any type of data storage. Database storage device 115 can also be a relational model database server. The relational model for database management, of database storage device 115, is based on first-order predicate logic. The First-order logic is a symbolized reasoning in which each sentence, statement, or information, stored in database storage device 115, is broken down into a subject and a predicate. The predicate modifies, or defines the properties of the subject. In first-order logic, a predicate can only refer to a single subject. Also, for instance, in the relational model of database storage device 106, all data is represented in terms of tuples, grouped into relations.

Database storage device 115 includes log files 120, screenshot files 125, and log diagnosis report 140. Log files 120 include a storage record of actions, or events, during system performance of administrative client program 111. Screenshot files 125 include a record of screenshots of client, or administrative actions of administrative client program 111. Log diagnosis report 140 represent a report of analysis of system performance of administrative client program 111, based on system performance of administrative client program 111.

Network 102 includes one or more networks of any kind that can provide communication links between various devices and computers connected together within system performance verification system environment 100. Network 102 can also include connections, such as wired communication links, wireless communication links, or fiber optic cables. Network 102 can also be implemented as a number of different types of networks, including, for example, a local area network (LAN), wide area network (WAN) or a packet switched telephone network (PSTN), or some other networked system. For example, system performance verification system environment 100 can utilize the Internet with network 102 representing a worldwide collection of networks. The term "Internet" as used according to embodiments of the present invention refers to a network, or networks that uses certain protocols, such as the TCP/IP protocol, and possibly other protocols such as the hypertext transfer protocol (HTTP) for hypertext markup language (HTML) documents that make up the world wide Web (the web).

Figure 2:
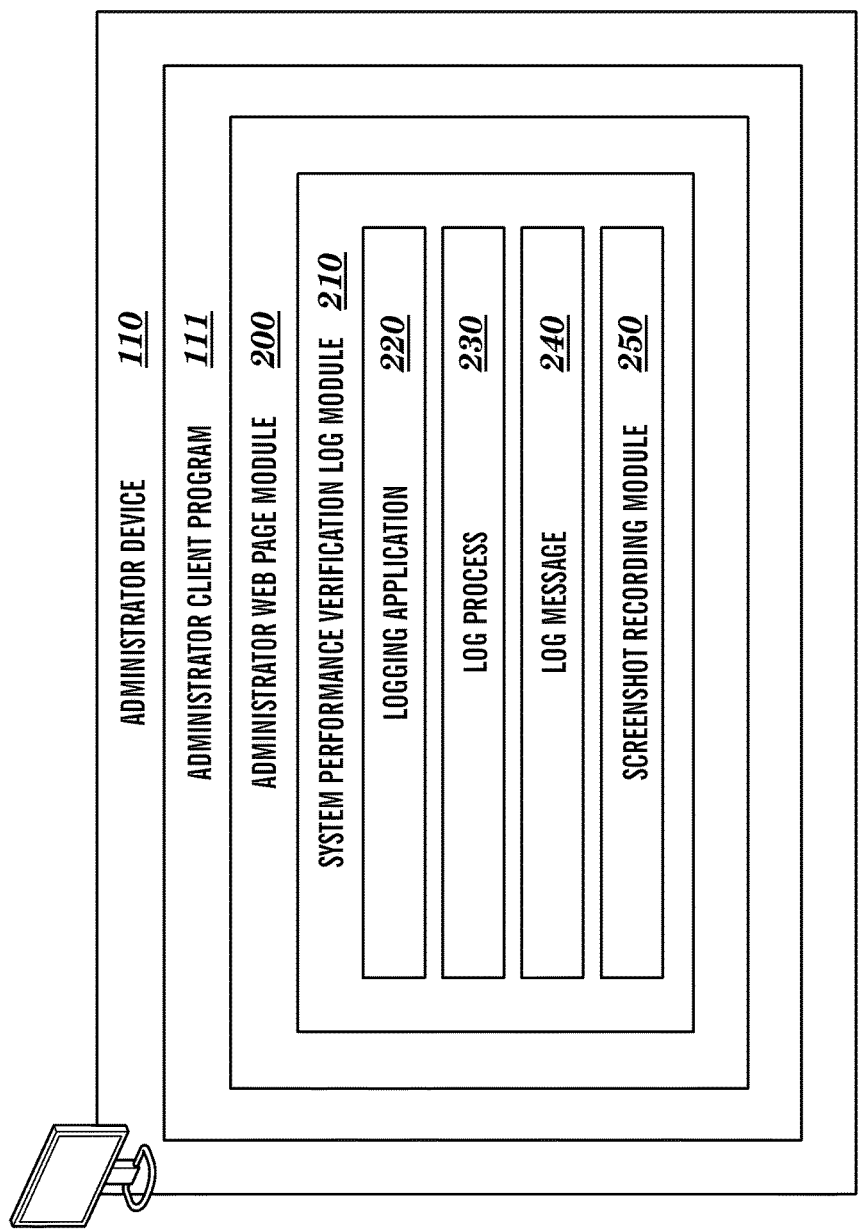
FIG. 2 is a functional block diagram illustrating program components of an administrator device in accordance with embodiments of the present invention.

FIG. 2 is a functional block diagram illustrating program components of administrator device 110, in accordance with embodiments of the present invention.

Administrative client program 111 can, among other things, retrieve, and display system content accessible for display in administrative client program 111, via network 102, such as web pages, or web server system application verification programs, during software performance verification, or diagnosis of administrative client program 111.

Administrative client program 111 can also be a web browser application program. For instance, in the depicted embodiment, administrator client program 111 includes administrative web page module 200. Administrative web page module 200 is a web browser plug-in/add-on that extends the functionality of administrative client program 111 by adding additional user interface elements to administrative client program 111, for recording client, user, or systems administrative actions in the additional user interface elements, during system diagnosis of administrative client program 111. Administrative web page module 200 includes system performance verification log module 210, which can be received in administrative client program 111, from mainframe server program 104, for performing system the system diagnosis of administrative client program 111. System performance verification log module 210 can include, program code, such as Hypertext Markup Language (HTML) code or JavaScript code that, when executed, adds one or more system user interface elements to administrative client program 111, for performance verification of administrator client program 111. System performance verification log module 210 includes logging application 220, log process 230, log message 240, and screenshot recording module 250.

Logging application 220 can be a web content manager application, a system testing application, a server/web server logging application, a control system logging application, a system subsystem logging application, log library application, or other application that provides a system platform for recording, testing, or logging administrative actions, or interactions, which can include, for example, client, user, or administrator utilization, or interaction, with a system, and/or one or more client application programs of administrator client program 111, during software performance verification, or system diagnosis of administrator client program 111. As described, according to at least one embodiment, the administrative actions can include administrator, or client management of hardware of the client computing device, such as, administrative control of monitor, keyboard, or mouse, and/or administrator control of program applications of administrator client program 111, which are recorded to diagnose a system crash, or problem of administrator device 110. Logging application 220 may be a purely server-side application, a purely client-side application, or a hybrid server-side/client-side application that is cooperatively executed by one or more administrator client program 111 and logging application 220, for performing diagnosis of system performance of administrator client program 111, in accordance with embodiments of the present invention.

Administrator client program 111 may be configured to effectual some or all of the functionality of logging application 220. Logging application 220 executes log process 230. Log process 230 receives an initiation indication, from server program, or directly from administrative client program, to conduct, within, administrator client program 111, a diagnosis performance test of a system crash, problem, or general performance of administrator device 110.

Log process 230 may monitor and/or receive one or more test initiations run-time calls for the specific run-time call associated with diagnosis of system performance of administrator client program 111. According to at least one embodiment, an administrator of administrator client program 111 can, also, manually invoke an integrated system tool, which is provided by mainframe server program 104 to initiate performance of the diagnosis system performance test. The diagnosis system performance test can also be performed, automatically, based on a timestamp, by the integrated system tool, as described below.

Log process 230 may be activated by logging application 220 to record a log, or a test case log file of monitored actions of administrative client program 111, during the performance of diagnosis of system performance of administrator client program 111. For instance, the recorded log, or test case log file generates log message 240. Log message 240 is dynamically generated as a result of recorded performance of diagnosis of system performance of administrative client program 111, in response to receiving the initiation indication that the test is initiating by logging process. For example, as is known to those skilled in the art, logging frameworks, such as, e.g., the Log4j logging library for the Java programming language may provide a mechanism for monitoring, and recording log messages 240, which is being produced, during the performance of diagnosis of system performance of administrator client program 111. Log message 240 is recorded to log files 120, in accordance with embodiments of the present invention.

Log message 240 may also include reports, and analysis of test log sets. The reports, or test log sets can include a historical record of events that occurred during a test run or a schedule run, as well as the status of each verification point of administrator client program 111. The test log sets a verdict for each run as follows, pass, which indicates that all verification points of the diagnosis of system performance of administrator client program 111 matched or received the expected response. For example, a response code verification point is set to PASS when the recorded response code is received during playback. If the test log sets does not contain verification points, PASS means that all primary requests in the test were successful.

The test log sets can also include, FAIL, which indicates that at least one verification point did not match the expected response or that the expected response was not received. The test log sets can further include, ERROR, which indicates one of the following results: a primary request was not successfully sent to the server, no response was received from the server for a primary request, or the primary request response was incomplete or could not be parsed.

System performance verification module 310 also executes screenshot recording module 250, which is received from mainframe server program 104 for recording screenshots of client administrative actions of administrator client program 111, wherein the screenshots are also recorded to identify a cause of a crash, or defect of administrator client program 111, during software performance verification, or system diagnosis of administrator client program 111. According to at least one embodiment, the screenshots are recorded by screenshot recording module 250 periodically, randomly, and/or using event-based recording of the client administrative actions of administrator client program 111. For instance, screenshot recording module 250 can be a stand alone application, or may be an applet application of either administrator client program 111, or mainframe server program 104, wherein the stand alone application is executed to monitor screenshots of recorded administrative interactions, or actions, within administrator client program 111, in accordance with embodiments of the present invention.

Screenshot recording module 250 further records the monitored screenshots, in screenshot files 125, for retrieval, transmittal, and further analysis of the recorded screenshots of administrative actions, for performance verification of the administrative actions of administrator client program 111. Recordation of the screenshots, of the monitored administrative actions, is performed based on a timestamp for recording the screenshots during the diagnosis test of system operations. According to at least one embodiment, the timestamp identifies/detects, occurrence of certain event during the monitoring of the administrative actions, wherein an occurred event triggers recordation of the screenshots of the administrative actions. For instance, the timestamp event, can be, a given date, or time of day, specified to record the administrative actions within administrator client program 111. The timestamp event can also be managed manually, by systems administrator of administrator client program 111, or automatically, based on configurations to performed recordation of the screenshots of the administrative actions, in accordance with embodiments of the present invention.

Figure 3:
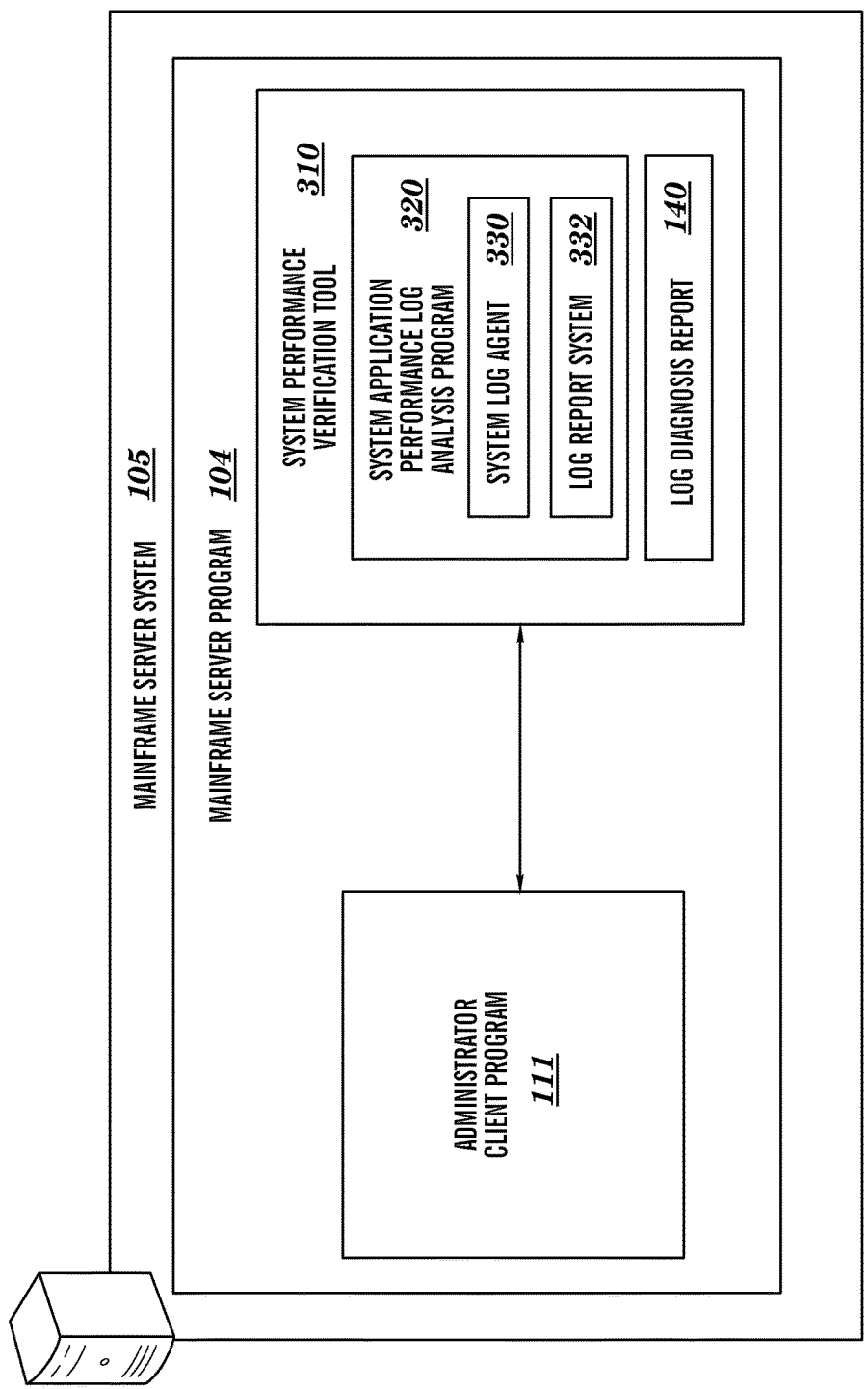
FIG. 3 is a functional block diagram illustrating program components of a mainframe server system for performing system application performance verification of an administrative client program in accordance with embodiments of the present invention.

FIG. 3 is a functional block diagram illustrating program components of mainframe server system 105 for performing system application performance verification of administrative client program 111. According to at least one embodiment, mainframe server program 104 executes system performance verification tool (SPVT) 310, which is connected to administrative client program 111, for examining the state of screenshots of administrative actions, during the performance of diagnosis of system performance of administrator client program 111.

Administrative client program 111 can be an enterprise system, which operates performance verification of Internet, or other software program applications of one or more system application platforms of administrative client program 111, wherein the state performance of recorded screenshots of the administrative actions is performed, as described below. SPVT 310 performs system performance verification of performance of the transmitted screenshots of recorded administrative actions, of administrative client program 111 and, also, based on examined state of operation of administrative client program 111.

SPVT 310 examines system program executions of the screenshots of administrative client program 111 periodically, randomly, and/or using event-based monitoring to conduct system performance verification of system logs of administrative client program 111. SPVT 310 includes system application performance log analysis program 320, which triggers system log agent 330 and log report system 332 to conduct the performance verification of the transmitted screenshots of the recorded administrative actions. System log agent 330 receives log files 120 and screenshot files 125 from log process 230, and screenshot recording module 250, respectively, via system performance verification log module 210, for performing the performance diagnosis of administrative client program 111, based on the recorded screenshots of administrative actions of administrative client program 111.

System log agent 330 may also reside in administrative client program 111, wherein, system log agent 330 can be triggered by SPVT 310, locally and/or through a remote procedure, to receive the log files 120 and screenshot files 125, of log process 230, and screenshot recording module 250, respectively and, thereafter, activate, within mainframe server program 104, a compiled report of system performance of administrative client program 111, based on the received log files 120 and screenshot files 125. Log report system 332 communicates with system log agent 330, periodically, randomly, and/or using event-based communication for generating a compiled report of system performance based on log information of each one of log files 120 and screenshot files 125. Log report system 332 generates and, transmits comments, or any information containing log events, and system operations of administrative client program 111, based on information in log files 120 and screenshot files 125, in accordance with embodiments of the present invention.

System log agent 330 monitors compilation of log files 120 and screenshot files 125, in administrative client program 111, periodically, randomly, event-based monitoring to diagnosis log diagnosis report 140, based on recorded screenshots of the administrative actions of administrative client program 111. Log report system 332 retrieves log files 120 and screenshot files 125, and compiles log diagnosis report 140 of events of recorded screenshots of administrative client program 111, including, for example, user interactions of administrative client program 111. Also, according to at least one embodiment, log report system 332 can also generate diagnosis log diagnosis report 140 based on conditions of administrative device 110, including, for instance, monitoring of power of administrative device 110, wherein the monitored power of administrative device 110 is based on conditions of whether administrative client program 111 is, idle, or inoperative.

Log files 120 and screenshot files 125 may also be transformed into an immediately consumable log document report, such as, a HTML file for easy viewing in a web browser, a detailed report of performance analysis of administrative client program 111, in log diagnosis report 140, and where, log diagnosis report 140 is transmitted to administrative client program 111, for display in an interface of administrative client program 111. Log diagnosis report 140, thus, not only contains log message 240 that were generated while performance diagnosis of administrative client program 111 was performed, but, log diagnosis report 140 also includes a reference, or visual representation of the administrator, client, or user actions of administrative client program 111, wherein, log diagnosis report 140 is transmitted to administrative client program 111, for display and, diagnosis of Log files 120 and screenshot files 125. For instance, when diagnosing an error of administrative client program 111, developers and testers can easily retrieve log diagnosis report 140 in the user interface for viewing, evaluating, or diagnosis of a problem or error of administrative client program 111, in accordance with embodiments of the present invention.

Figure 4A:
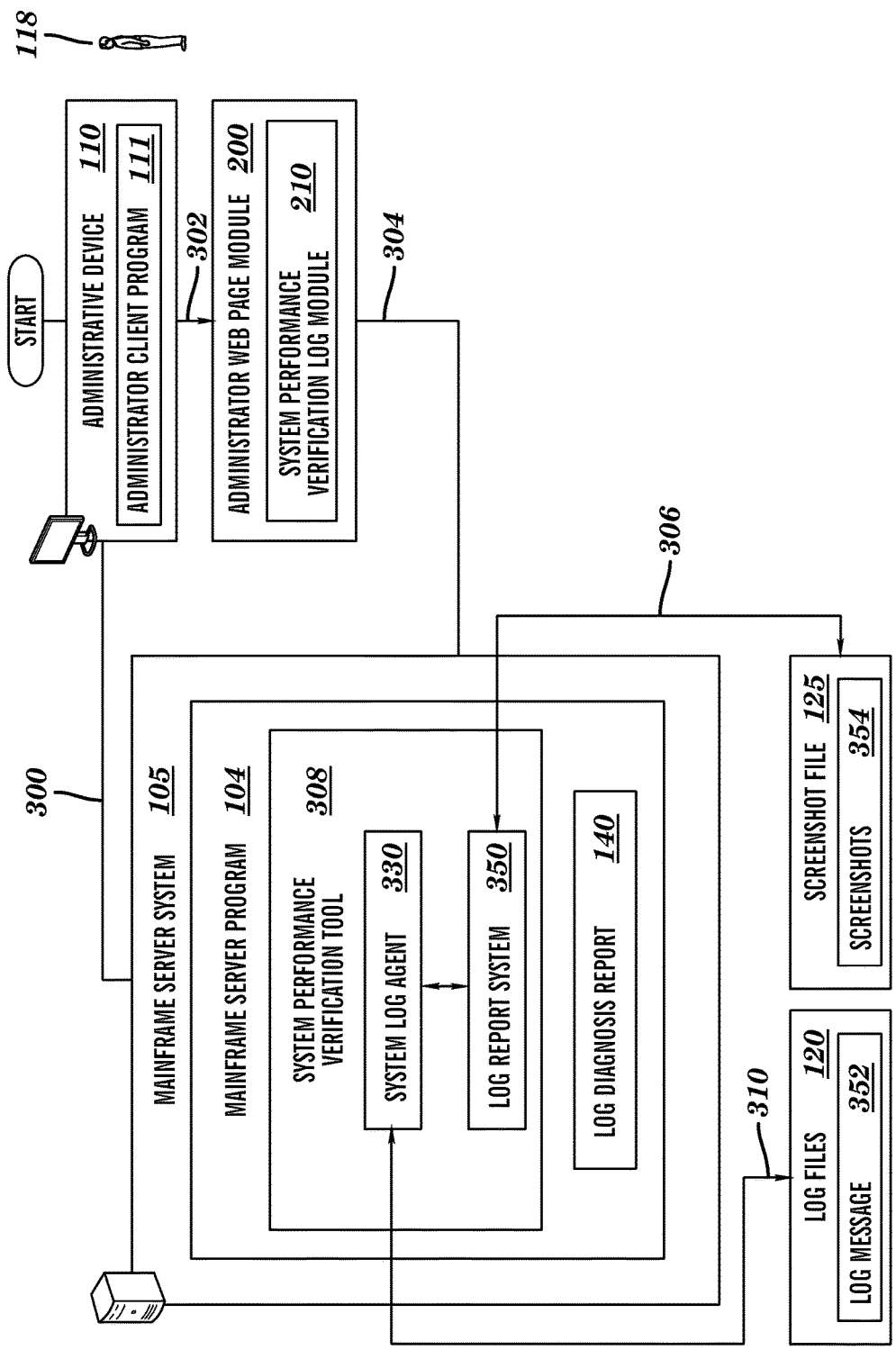
FIGS. 4A-4C depict functional block diagrams for requesting recordation of screenshots of administrative actions of an administrative client program, during performance of a system application performance verification of the administrative client program in accordance with embodiments of the present invention.

FIG. 4A is a functional block diagram illustrating program operations for manually requesting recordation of screenshots of administrative actions of administrative client program 111, to identify a cause of crash, or detect of administrative client program 111, wherein at flow 300, administrative device 110 is communicatively connected to mainframe server system 105 to perform recordation of screenshots of administrative actions of administrative client program 111, in accordance with embodiments of the present invention. At flow 302, administrator 118 manually invokes system performance verification log module 210 of administrative client program 111, to initiate performance of recordation of screenshots of administrative actions of administrative client program 111.

Also, administrator 118 manually specifies, in screenshot recording module 230, a timestamp of how the screenshots should be recorded. For instance, the configurations for recording administrative actions as screenshots, can be in the form of a comment, or indication of how, when, and what administrative actions, detected in system performance verification log module, should be recorded as screenshots, in screenshot recording module 230. Based on the manual preferences, or indications by administrator 118, in system performance verification log module 210, screenshot recording module 230 monitors the screenshots of the recorded administrative interactions, or actions, within administrator client program 111, and wherein, screenshot recording module 230 further records the monitored screenshots 354, in screenshot files 125, for retrieval, transmittal, and further analysis of the recorded screenshots of administrative actions, for performance verification of the administrative actions of administrator client program 111.

At flow 304, the recorded monitored screenshots 354 of screenshot files 125 are retrieved by system performance verification tool (SPVT) 310, which is connected to administrative client program 111, for examining the state of screenshots 354, based on the recorded administrative actions, during the performance of diagnosis of system performance of administrator client program 111. SPVT 310 examines system program executions of screenshots 354 of administrative client program 111 periodically, randomly, and/or using event-based monitoring to conduct system performance verification of system logs of administrative client program 111.

At flow 306, screenshot file 125 directly correlates with log report system 350, to examine screenshots 354 of the recorded administrative actions of administrative client program 111. For instance, according to at least one embodiment, log report system 350 communicates with system log agent 330, periodically, randomly, and/or using event-based communication for generating a compiled report of log diagnosis report 140 of system performance based on log information of each one of log files 120 and screenshot files 125. For instance, according to at least one embodiment, log report system 350 further generates and, transmits comments, or any information containing log events, and system operations of administrative client program 111, based on information in log files 120 and screenshot files 125 to administrative client program 111, for display, in a user interface of administrative client program 111.

At flow 310, system log agent 330 is triggered by SPVT 310, locally and/or through a remote procedure, to receive log message 352. Thereafter, in at least one embodiment, system log agent 330 activates, within mainframe server program 104, a compiled report of system performance of administrative client program 111, based on the received log files 120 and screenshot files 125, wherein the compiled report of system performance of administrative client program 111 is generated by log diagnosis report 140, and transmitted to administrative client program 111 for display to administrator 118, or a client, or user of administrative client program 111.

Figure 4B:
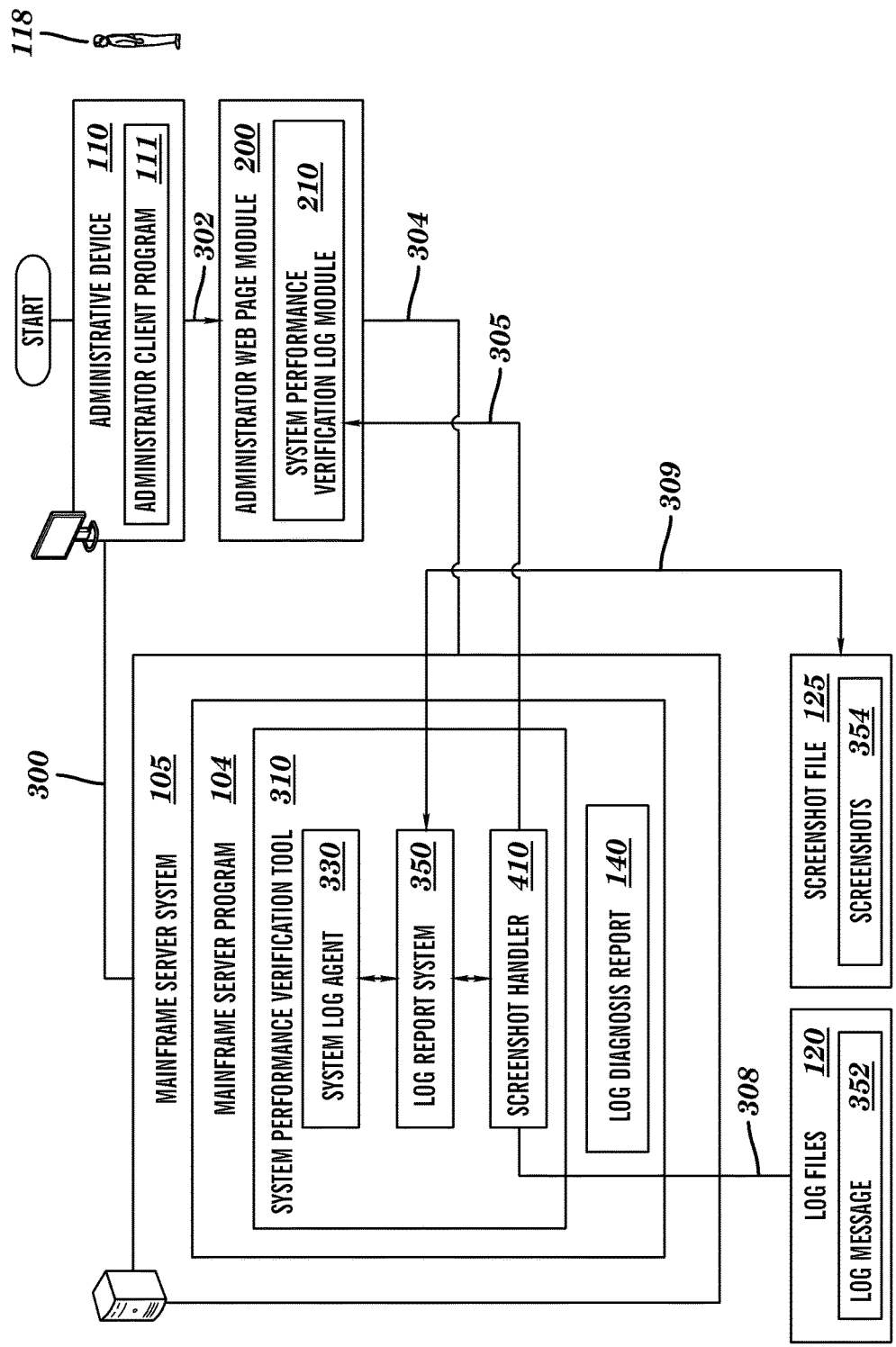

FIG. 4B is a functional block diagram that illustrates program operations for performing automatic, server initiated request for recordation of screenshots of administrative actions in administrative client program 111, by mainframe server program 104 via system application performance analysis program 320, wherein at flow 300, administrative device 110 is communicatively connected to mainframe server system 105 to perform recordation of screenshots of administrative actions of administrative client program 111, in accordance with embodiments of the present invention.

At flow 304, the recorded monitored screenshots 354 of screenshot files 125 are retrieved by SPVT 310, which is connected to administrative client program 111, for examining the state of performance analysis screenshots 354, based on the recorded administrative actions of log diagnosis report. For instance, alternatively, at flow 305, system performance verification log module 210 automatically transmits recorded screenshots of the administrative actions to screenshot handler 410, which is connected screenshot handler 410, for automatically performing the performance verification of the monitored screenshots of administrative client program 111. According to at least one embodiment, at flow 308, screenshot handler 410 is triggered by SPVT 310, locally and/or through a remote procedure, to receive log message 352. Further, at flow 309, system log agent 330 receives screenshots 354 of screenshot files 125, from log process 230, and screenshot recording module 250, respectively, in accordance with embodiments of the present invention. As described above, screenshot file 125 directly correlates with log report system 350, to examine screenshots 354 of the recorded administrative actions of administrative client program 111.

Figure 4C:
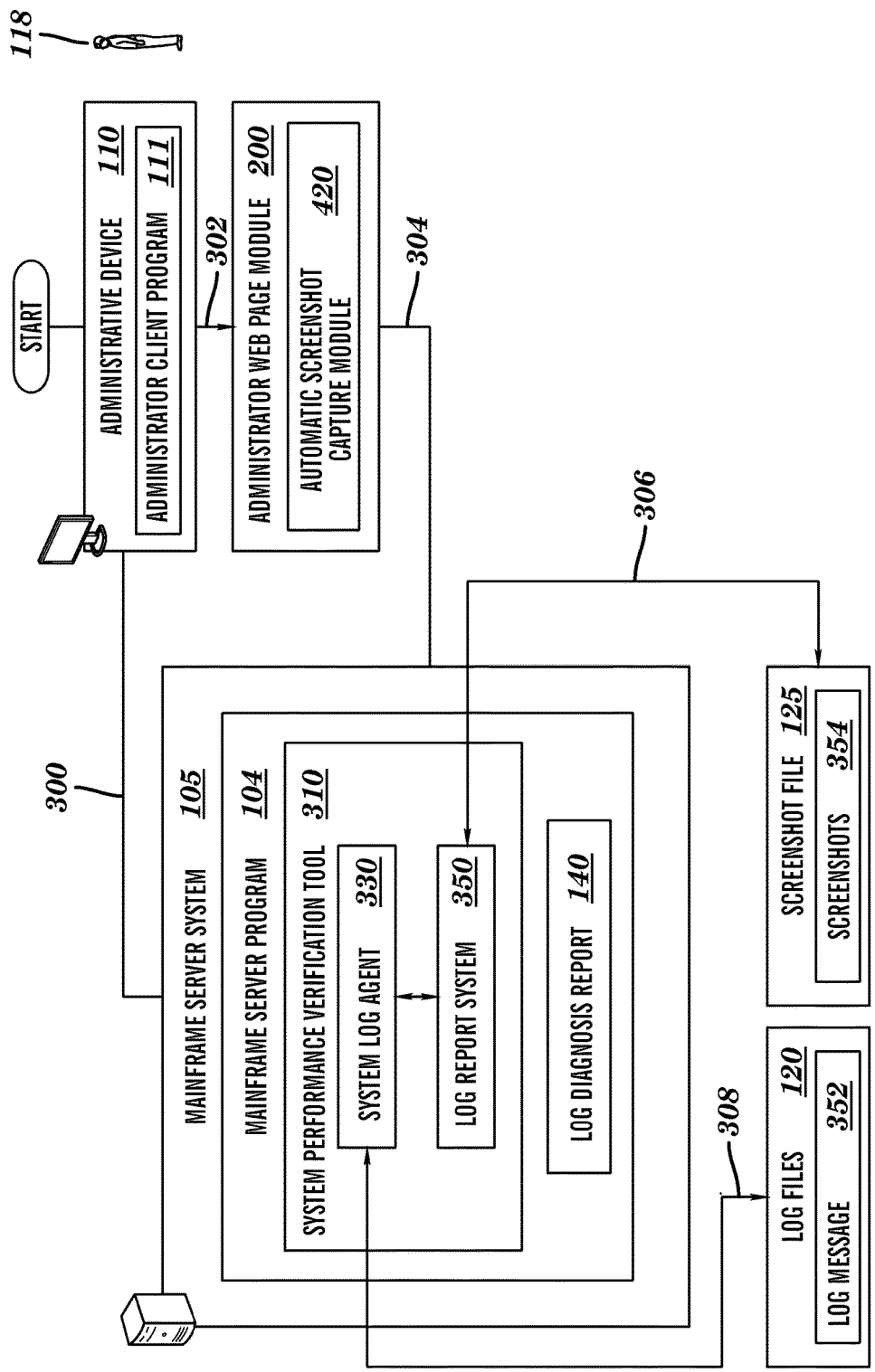

FIG. 4C is a functional block diagram that illustrates program operations for automatic capture of screenshots by administrative client program 111, based on program instruction, by administrator 118 in administrative client program 111, wherein at flow 300, administrative device 110 is communicatively connected to mainframe server system 105 to perform recordation of screenshots of administrative actions of administrative client program 111. At flow 302, automatic screenshot capture module 420 dynamically captures screenshots of administrative actions of administrative client program 111 based on initiated timestamp for capturing screenshots of the administrator actions. At flow 304 automatic screenshot capture module 420 dynamically transmits the automatically recorded, monitored screenshots 354 of screenshot files 125 are retrieved by system performance verification tool (SPVT) 310, which is connected to administrative client program 111, for examining the state of screenshots 354, based on the recorded administrative actions, during the performance of diagnosis of system performance of administrator client program 111.

As described, at flow 306, screenshot file 125 directly correlates with log report system 350, to examine screenshots 354 of the recorded administrative actions of administrative client program 111. For instance, log report system 350 communicates with system log agent 330, periodically, randomly, and/or using event-based communication for generating a compiled report of log diagnosis report 140 of system performance based on log information of each one of log files 120 and screenshot files 125. For instance, log report system 350 further generates and, transmits comments, or any information containing log events, and system operations of administrative client program 111, based on information in log files 120 and screenshot files 125 to administrative client program 111, for display, in a user interface of administrative client program 111. Also, at flow 308, system log agent 330 is triggered by SPVT 310, locally and/or through a remote procedure, to receive log message 352.

Figure 5A:
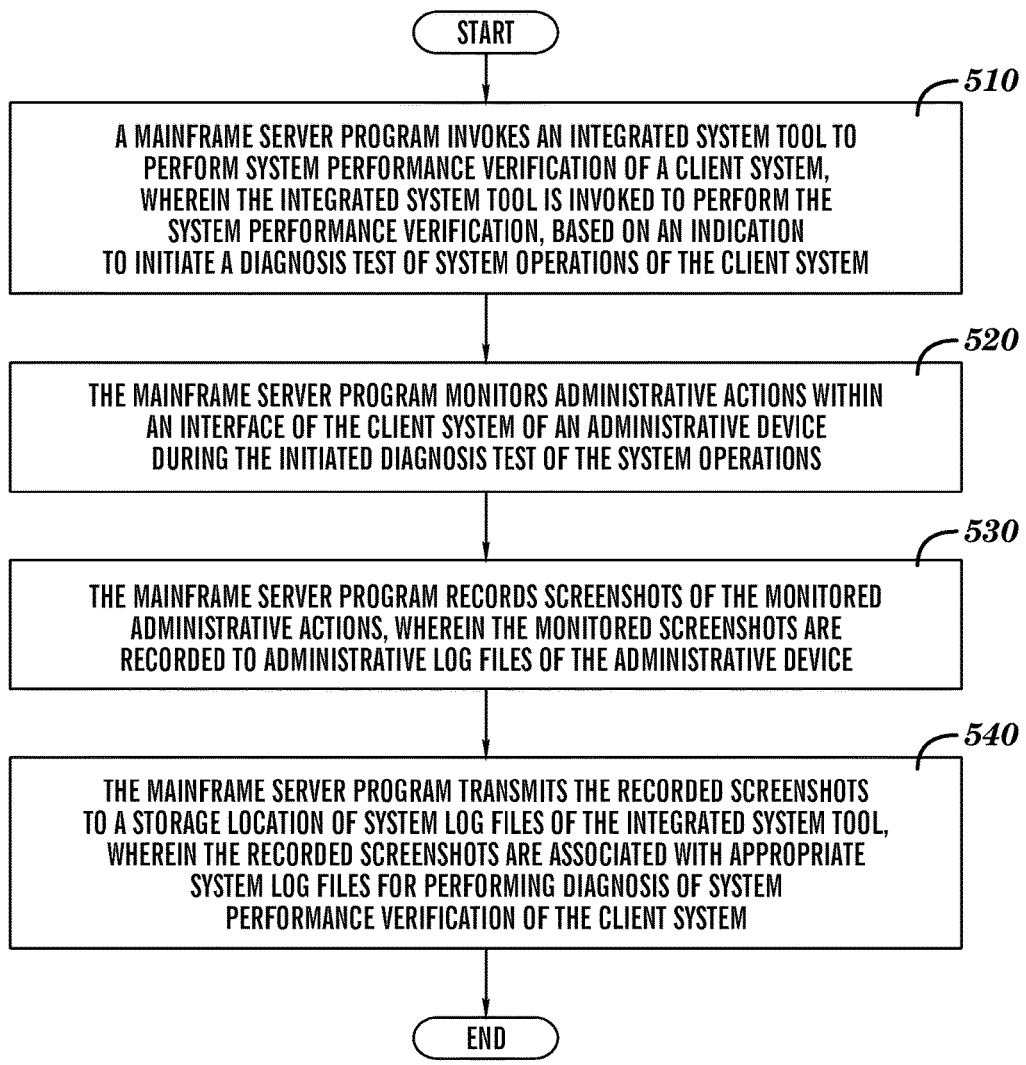
FIGS. 5A-5B are flow diagrams depicting steps performed by a mainframe server program for conducting system performance verification of an administrative client program in accordance with embodiments of the present invention.

FIG. 5A is a flow diagram depicting steps performed by mainframe server program 104 for system performance verification of administrative client program 111, in accordance with embodiments of the present invention. Mainframe server program 104 invokes system performance verification tool (SPVT) 310 to perform system performance verification of administrative client program 111, wherein SPVT 310 is invoked to perform the system performance verification, based on an indication to initiate a diagnosis test of system operations of administrative client program 111. (Step 510). Mainframe server program 104 further monitors administrative actions of a user, client, or system administrator of administrative client program 111, within an interface of administrative client program 111, during the initiated diagnosis test of the system operations of administrative client program 111. (Step 520). Mainframe server program 104 further records screenshots of the monitored administrative actions of administrative client program 111, wherein the monitored screenshots are recorded to administrative log files 120 of the administrative client program 111. (Step 530).

Mainframe server program 111 further transmits the recorded screenshots to a storage location of system log files, including, for instance log files 120, wherein the recorded screenshots are associated with appropriate log files 120 for performing diagnosis of system performance verification of administrative client program 111. (Step 540). For instance, as described, log files 120 include a storage record of actions, or events, during system performance of administrative client program 111. The recorded screenshots are associated, directly, or by reference with log files 120. Recordation of the screenshots of the monitored administrative actions is performed based on a timestamp for recording the screenshots during the diagnosis test of system operations of administrative client program 111.

Figure 5B:
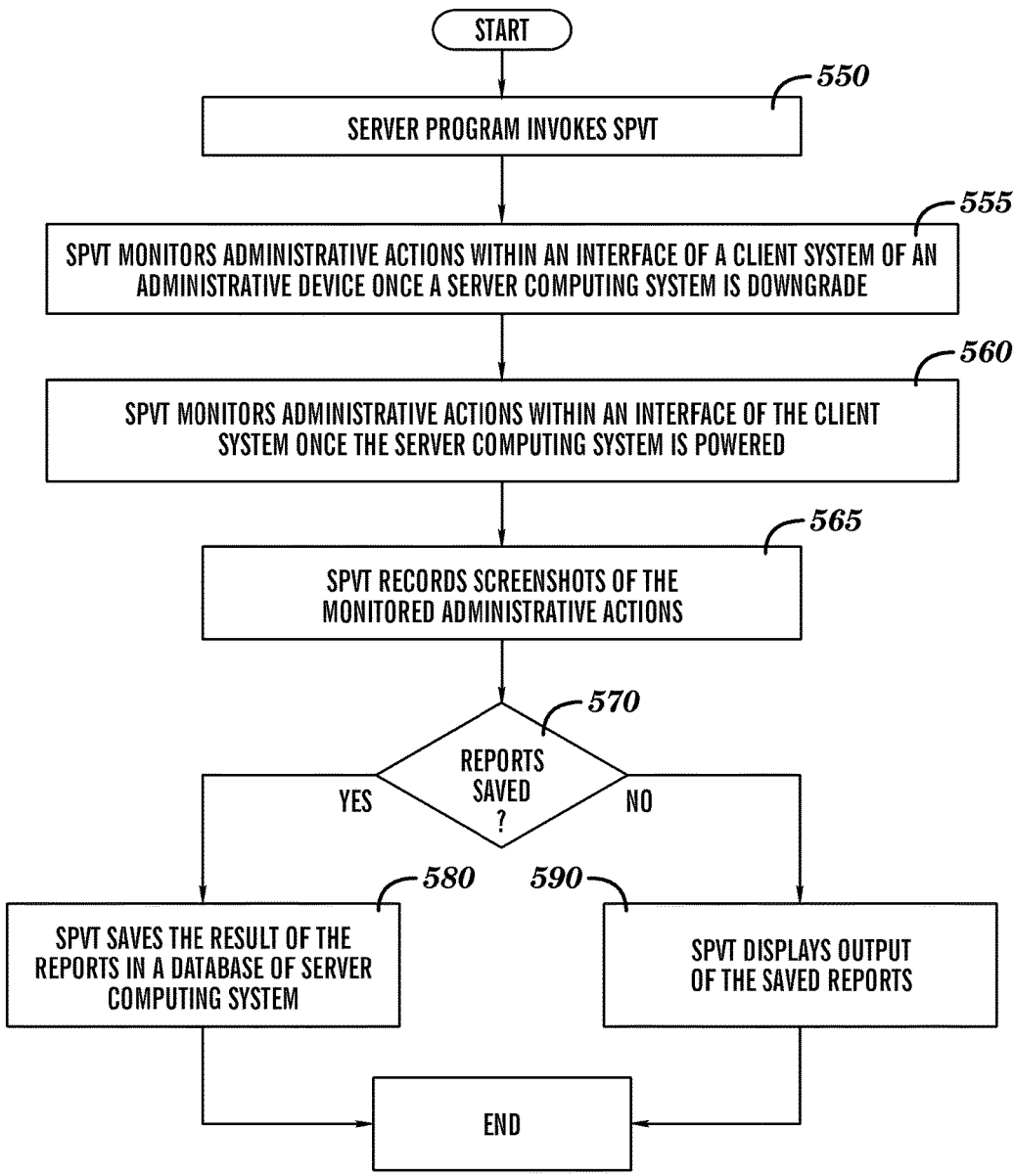

FIG. 5B is a flow depicted steps performed by SPVT 310 to verify operation performance of administrative client program 111, including, for instance, summary reports of recordation of screenshot of operations changes of administrative actions, recorded, as screenshots in administrative client program 111, in accordance with embodiments of the present invention.

Mainframe server program 104 invokes SPVT 310 to perform system performance verification of administrative client program 111, wherein SPVT 310 is invoked to perform the system performance verification, based on an indication to initiate a diagnosis test of system operations of administrative client program 111. (Step 550). SPVT monitors administrative actions within an interface of administrative client program 111, once mainframe server system 105 is downgraded, or shut down. (Step 555).

SPVT 310 monitors administrative actions within an interface of administrative client program 111, once mainframe server program 104 is powered. (Step 560). SPVT 310 further records screenshots of the monitored administrative actions, when mainframe server system 105 is downgraded, or powered. (Step 565). SPVT 310 determines whether a diagnosis report of the recorded screenshots was saved in database storage device 115. (Decision 570). For instance, if the screenshots was not saved in database storage device 115, then at step 590, SPVT 310 transmits the recorded screenshots to administrative client program 111, for display of test results diagnosis test of system operations of administrative client program 111. However, if result were saved in database storage device 115, then at step 580, SPVT 310 saves results of reports of the recorded screenshots in database storage device 115.

Figure 6:
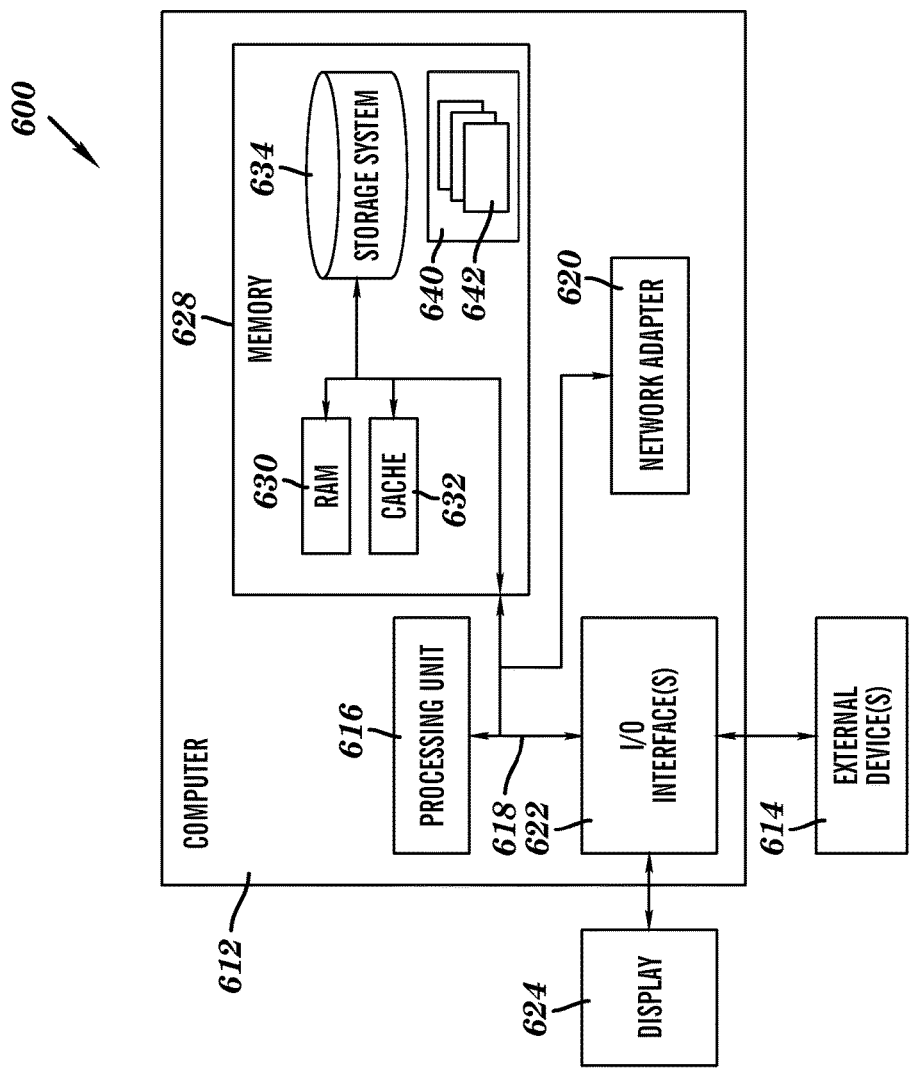
FIG. 6 illustrates a block diagram of components of a computer system in accordance with embodiments of the present invention.

FIG. 6 is a functional block diagram of a computer system 600, in accordance with an embodiment of the present invention.

The Computer system of FIG. 6 is only one example of a suitable computer system and is not intended to suggest any limitation as to the scope of use or functionality of embodiments of the invention described herein. Regardless, the computer system is capable of being implemented and/or performing any of the functionality set forth hereinabove. In the computer system of FIG. 1, there is computer 612, which is operational with numerous other general purpose or special purpose computing system environments or configurations. Examples of well-known computing systems, environments, and/or configurations that may be suitable for use with computer 612 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Each one of administrator devices 110, 112, 114, mainframe server system 105 can be implemented as an instance of computer 612. Computer 612 may be described in the general context of computer system executable instructions, such as program modules, being executed by a computer system. Generally, program modules may include routines, programs, objects, components, logic, data structures, and so on that perform particular tasks or implement particular abstract data types. Computer 612 may be practiced in distributed cloud computing environments where tasks are performed by remote processing devices that are linked through a communications network. In a distributed cloud computing environment, program modules may be located in both local and remote computer system storage media including memory storage devices.

As further shown in FIG. 6, computer 612 is shown in the form of a general-purpose computing device. The components of computer 612 may include, but are not limited to, one or more processors or processing units 616, memory 628, and bus 618 that couples various system components including memory 628 to processing unit 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 612 typically includes a variety of computer system readable media. Such media may be any available media that is accessible by computer 612, and includes both volatile and non-volatile media, and removable and non-removable media.

Memory 628 includes computer system readable media in the form of volatile memory, such as random access memory (RAM) 630 and/or cache 632. Computer 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Administrator client program 111 and mainframe server program 104 can be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein. Each one of administrator client program 111 and mainframe server program 104 are implemented as or are an instance of program 640.

Computer 612 may also communicate with one or more external devices 614 such as a keyboard, a pointing device, etc., as well as display 624; one or more devices that enable a user to interact with computer 612; and/or any devices (e.g., network card, modem, etc.) that enable computer 612 to communicate with one or more other computing devices. Such communication occurs via Input/Output (I/O) interfaces 622. Still yet, computer 612 communicates with one or more networks such as a local area network (LAN), a general wide area network (WAN), and/or a public network (e.g., the Internet) via network adapter 620. As depicted, network adapter 620 communicates with the other components of computer 612 via bus 618. It should be understood that although not shown, other hardware and/or software components could be used in conjunction with computer 612. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustrations, are implemented by special purpose hardware-based systems that perform the specified functions or acts, or combinations of special purpose hardware and computer instructions.

As will be appreciated by one skilled in the art, embodiments of the present invention may be embodied as a system, method or computer program product. Accordingly, embodiments of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, embodiments of the present invention may take the form of a computer program product embodied in one or more computer-readable medium(s) having computer-readable program code embodied thereon.

In addition, any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that contains, or stores a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that communicates, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing. Computer program code for carrying out operations for embodiments of the present invention may be written in any combination of one or more programming languages, including an object oriented programming language such as Java, Smalltalk, C++ or the like, conventional procedural programming languages such as the "C" programming language, a hardware description language such as Verilog, or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Based on the foregoing a method, system and computer program product method for system performance verification has been disclosed. However, numerous modifications and substitutions can be made without deviating from the scope of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. Therefore, the present invention has been disclosed by way of example and not limitation.

What is claimed is:

1. A computer system for system performance verification, the computer system comprising:
   one or more processors, one or more computer-readable memories, one or more computer-readable tangible storage devices and program instructions which are stored on at least one of the one or more storage devices for execution by at least one of the one or more processors via at least one of the one or more memories, the program instructions comprising:

program instructions for an integrated system tool to perform system performance verification of a client system, wherein the integrated system tool is invoked to perform the system performance verification based on an indication to initiate a diagnosis test of system operations of the client system, wherein the integrated system tool is automatically invoked to perform the system performance verification based on run-time calls of the initiated diagnosis test;

program instructions to monitor administrative actions within an interface of the client system of an administrative device during the initiated diagnosis test of the system operations, wherein the interface of the client system is a browser plug-in that captures screenshots of the monitored administrative actions;

program instructions to screenshots of the monitored administrative actions, wherein the recorded screenshots are recorded to administrative log files of the administrative device;

program instructions to transmit the recorded screenshots to a storage location of system log files of the integrated system tool, wherein the recorded screenshots are associated with appropriate system log files for performing diagnosis of system performance verification of the client system, wherein the recorded screenshots are associated, directly, or by reference, with the system log files, wherein the association of the recorded screenshots and the system log files provides a platform for directly referencing, or identifying, the log files with appropriate server system test diagnosis log reports of the system log files, wherein recordation of the screenshots of the monitored administrative actions is performed based on a timestamp for recording the screenshots during the diagnosis test of system operations, and wherein the timestamp is a captured state of operations of the integrated system tool of the client system;

program instructions at least one log message during the initiated diagnosis test of the system operations, wherein the system log files are dynamically generated in response to initiation indication of the diagnosis test, wherein the generated at least one log message is recorded to administrative log files of the administrative device, and wherein the generated at least one log message is a test case log file representative of the diagnosis test for system performance verification of the client system; and program instructions to associate recorded screenshots, and the generated at least one log message, with the system log files, wherein the at least one log message includes a record of administrative actions taken by an administrator during the system diagnosis test, or text files of system operations of the client system during the diagnosis test.

2. The computer system of claim 1, wherein the integrated system tool is manually, or automatically invoked.

3. A computer program product for system performance verification, the computer program product comprising:
   one or more processors, one or more computer-readable memories, one or more computer-readable tangible storage devices and program instructions which are stored on at least one of the one or more storage devices for execution by at least one of the one or more processors via at least one of the one or more memories, the program instructions comprising:

program instructions for an integrated system tool to perform system performance verification of a client system, wherein the integrated system tool is invoked to perform the system performance verification based on an indication to initiate a diagnosis test of system operations of the client system, wherein the integrated system tool is automatically invoked to perform the system performance verification based on run-time calls of the initiated diagnosis test;

program instructions to monitor administrative actions within an interface of the client system of an administrative device during the initiated diagnosis test of the system operations, wherein the interface of the client system is a browser plug-in that captures screenshots of the monitored administrative actions;

program instructions to screenshots of the monitored administrative actions, wherein the recorded screenshots are recorded to administrative log files of the administrative device;

program instructions to transmit the recorded screenshots to a storage location of system log files of the integrated system tool, wherein the recorded screenshots are associated with appropriate system log files for performing diagnosis of system performance verification of the client system, wherein the recorded screenshots are associated, directly, or by reference, with the system log files, wherein the association of the recorded screenshots and the system log files provides a platform for directly referencing, or identifying, the log files with appropriate server system test diagnosis log reports of the system log files, wherein recordation of the screenshots of the monitored administrative actions is performed based on a timestamp for recording the screenshots during the diagnosis test of system operations, and wherein the timestamp is a captured state of operations of the integrated system tool of the client system;

program instructions at least one log message during the initiated diagnosis test of the system operations, wherein the system log files are dynamically generated in response to initiation indication of the diagnosis test, wherein the generated at least one log message is recorded to administrative log files of the administrative device, and wherein the generated at least one log message is a test case log file representative of the diagnosis test for system performance verification of the client system; and program instructions to associate recorded screenshots, and the generated at least one log message, with the system log files, wherein the at least one log message includes a record of administrative actions taken by an administrator during the system diagnosis test, or text files of system operations of the client system during the diagnosis test.

* * * * *